United States Patent
Patenaude et al.

(10) Patent No.: US 9,116,008 B2
(45) Date of Patent: Aug. 25, 2015

(54) POTABLE GEO-CODED AUDIO

(75) Inventors: Russell A. Patenaude, Macomb, MI (US); Christine E. Meissner, Royal Oak, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 714 days.

(21) Appl. No.: 12/165,140

(22) Filed: Jun. 30, 2008

(65) Prior Publication Data

US 2009/0326806 A1    Dec. 31, 2009

(51) Int. Cl.
*G01C 21/34* (2006.01)
*G01C 21/36* (2006.01)

(52) U.S. Cl.
CPC .......... *G01C 21/343* (2013.01); *G01C 21/3644* (2013.01); *G01C 21/3697* (2013.01)

(58) Field of Classification Search
USPC ......... 340/539.13, 539.1, 539.11, 572.1, 988, 340/357.23, 457; 701/468, 469
See application file for complete search history.

(56) References Cited

U.S. PATENT DOCUMENTS

| | | | | |
|---|---|---|---|---|
| 6,360,167 | B1 * | 3/2002 | Millington et al. | 701/516 |
| 6,785,551 | B1 * | 8/2004 | Richard | 455/456.1 |
| 6,810,323 | B1 * | 10/2004 | Bullock et al. | 701/467 |
| 7,711,475 | B1 * | 5/2010 | Cona et al. | 701/202 |
| 8,547,222 | B2 * | 10/2013 | Aninye et al. | 340/539.13 |
| 8,761,992 | B2 * | 6/2014 | Sennett et al. | 701/29.1 |
| 2008/0147311 | A1 * | 6/2008 | Zoller et al. | 701/201 |

* cited by examiner

*Primary Examiner* — Adam Tissot
(74) *Attorney, Agent, or Firm* — Leydig, Voit & Mayer, Ltd.

(57) ABSTRACT

A method of providing route guidance to a vehicle user via a telematics unit comprises reading geo-coded route data from a removable medium at the telematics unit, the geo-coded data comprising a list of location and events associated with respective actions. The system senses the vehicle location and event status during the course of a trip. If the vehicle location matches a vehicle location listed in the geo-coded route data, the system executes an action associated in the list with that location and if a sensed event status indicates the occurrence of an event listed in the geo-coded route data, the system executes an action associated in the list with that event.

14 Claims, 5 Drawing Sheets

| EVENT | LOCATION | ACTION |
|---|---|---|
| Warning | ---- | Notify MOM |
| Collision | ---- | Notify MOM, Notify INSURER |
| Ignition | Start Point | Notify SALLY |
| ---- | Elm Lake | Play elmlake.wav |
| ---- | Niagra Falls | Play niagra.wav |
| ---- | New York City | Play nycintro.wav |
| ---- | Sally's House | Notify MOM, Notify Sally |

| EVENT | LOCATION | ACTION |
|---|---|---|
| Warning | ---- | Notify MOM |
| Collision | ---- | Notify MOM, Notify INSURER |
| Ignition | Start Point | Notify SALLY |
| ---- | Elm Lake | Play elmlake.wav |
| ---- | Niagra Falls | Play niagra.wav |
| ---- | New York City | Play nycintro.wav |
| ---- | Sally's House | Notify MOM, Notify Sally |

*FIGURE 5*

POTABLE GEO-CODED AUDIO

FIELD OF THE INVENTION

This invention relates generally to automated route guidance and more particularly to a system for executing prescribed actions based on geo-coded data linking actions to events and locations.

BACKGROUND OF THE INVENTION

Cars and other vehicles are popular forms of transportation for business and commerce purposes, but are also increasingly used as tools for entertainment and leisure. For example, traveling by car is a favorite past time in the United States, and road trips are often accompanied by touring along the way. For example, a party traveling from Connecticut to New Jersey may travel by way of New York to visit famous sites such as the Empire State Building or the Statue of Liberty. Most automobiles that feature navigation systems also have communication facilities to allow real time updating of navigation activities such as route directions. However, some systems do not include communications facilities, or the user does not wish to use such facilities because of cost or other considerations.

Moreover, while navigation instructions with respect to both roads and sites can be useful, there is presently a difficulty in allowing a third party to track the progress of the driver. For example, a parent of a teenager may wish to observe the progress of the teenager in driving from point A to point B, or may wish to at least have some way of knowing that the trip was safely and successfully made.

BRIEF SUMMARY OF THE INVENTION

Examples of the invention offer a method of providing route guidance to a vehicle user via a telematics unit comprises reading geo-coded route data from a removable medium at the telematics unit, the geo-coded data comprising a list of location and events associated with respective actions. The system senses the vehicle location and event status during the course of a trip. If the vehicle location matches a vehicle location listed in the geo-coded route data, the system executes an action associated in the list with that location and if a sensed event status indicates the occurrence of an event listed in the geo-coded route data, the system executes an action associated in the list with that event.

In other aspects of the invention a computer-readable medium is given for providing the route guidance, and in a further example a system of providing route guidance is disclosed. Further aspects of the invention will be appreciated from the description herein.

DETAILED DESCRIPTION OF THE INVENTION

Before describing the invention in detail, an exemplary environment in which the invention may operate will be described. It will be appreciated that the described environment is for purposes of illustration only, and does not imply any limitation regarding the use of other environments to practice the invention.

Figure 1:
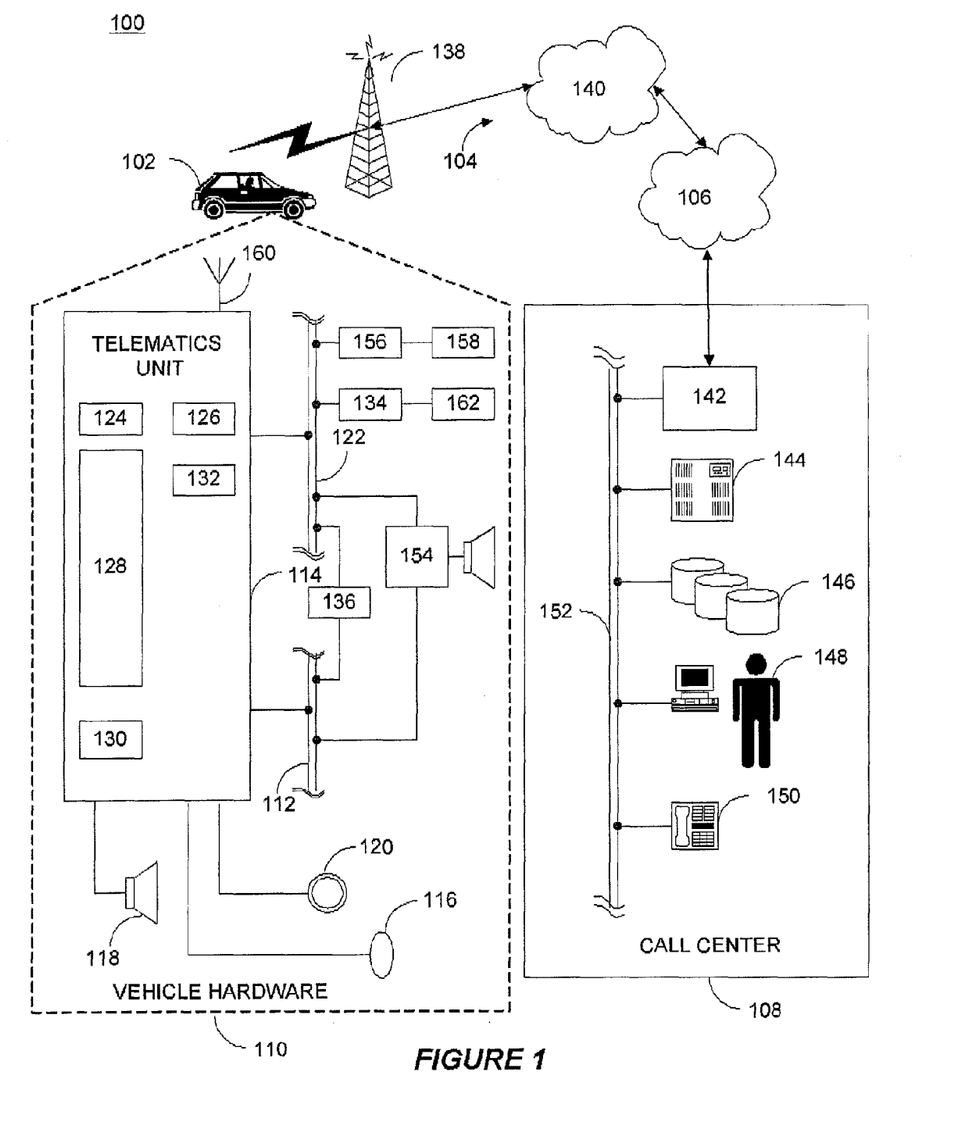
FIG. 1 is a schematic view of an example communication system within which the present invention optionally may be implemented.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various accident and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle accident and/or collision detection sensor interface 156 are operatively connected to the vehicle bus 122. The accident sensors 158 provide information to the telematics unit via the accident and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Although the illustrated system of FIG. 1 includes communications facilities for communicating between the telematics unit 114 and a facility such as a call center or server for providing navigation assistance, some systems do not include communications facilities, or the user does not wish to use such facilities because of cost or other considerations. Moreover, while navigation instructions with respect to both roads and sites can be useful, there is still presently no convenient and efficient way to allow a third party to track the progress of the trip. For example, a parent of a teenage driver may wish to observe the progress of the teenager and/or may wish to have some way of knowing that the trip was safely and successfully made.

Figure 2:
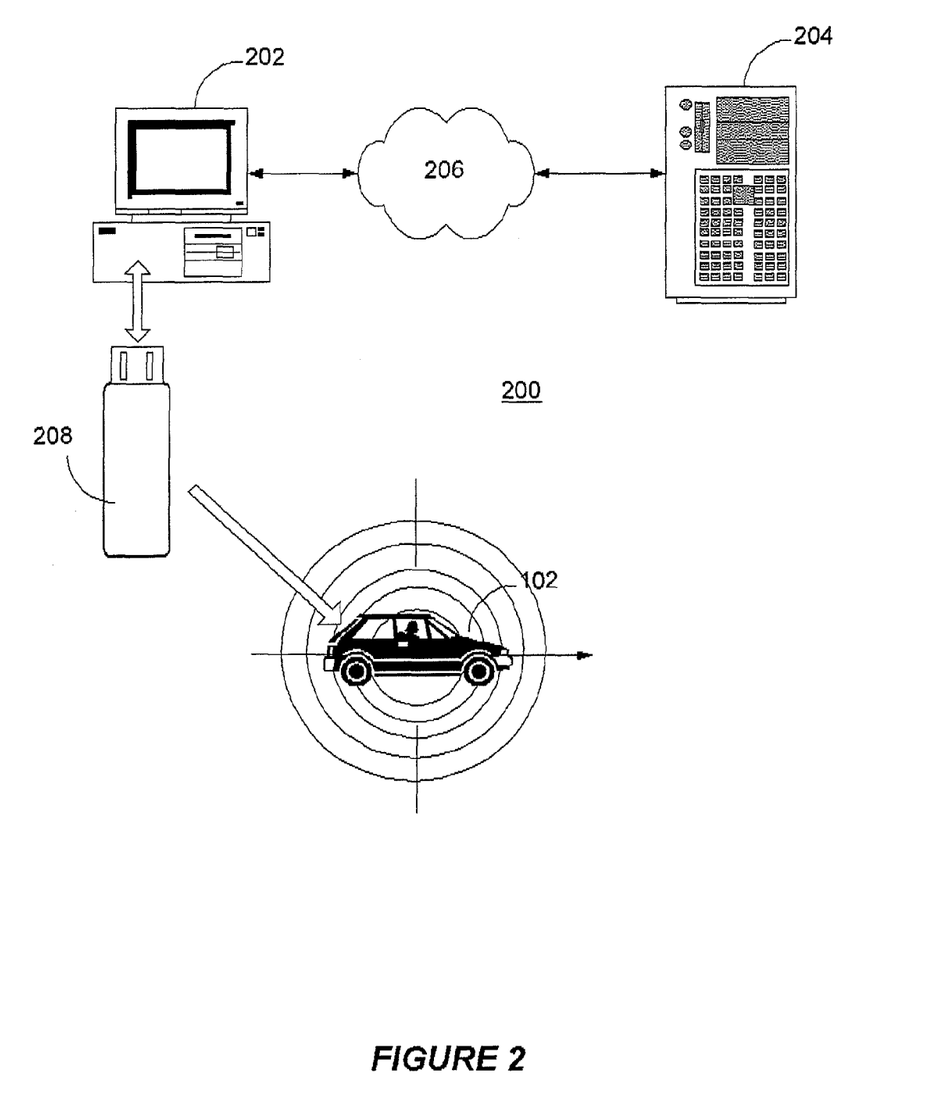
FIG. 2 is system schematic according to an example implementation.

In an example of the disclosed principles, a system is provided for allowing a user to obtain directions and other route and navigation information. In a further aspect, geo-actionable information is provided both for the benefit of the driver and for the benefit of a third party. FIG. 2 is a schematic view of system for implementing the disclosed principles. The illustrated system 200 includes a personal computer 202 or other computing device with communication facilities and a server 204, linked to the personal computer 202 via a network 206. Network 206 may be the Internet or other network, and may comprise one or more types of network link such as hard wire, wireless, packetized, etc.

A removable media unit 208 is associated with the personal computer 202 by the user of the personal computer 202. The removable media unit 208 is a flash drive or "thumb drive" in an implementation, but may alternatively be another type of human tangible computer-readable medium such as a magnetic or optical disc, etc. In overview, the user of the personal computer 202 is able to locate and download geo-relevant information over the network 206 on the server 204. The geo-relevant information may be downloaded to the removable media unit 208 directly or may be downloaded first to the personal computer 202, and from there be transferred to the removable media unit 208.

The personal computer preferably holds and runs an application for selecting and configuring the geo-relevant information so as to provide a desired sequence of way points or destinations as well as to provide actionable data tied to vehicle location or vehicle-related events. For example, a user may wish to set actions associated with trip initiation (e.g., when the vehicle is located at the starting point and an ignition event is detected), reaching of the trip destination (e.g., when the vehicle is located at the destination point), and vehicle events such as collision or user warnings or notifications (out of gas, oil low, engine over temperature, etc.), departure from a specified route, etc.

When the user has downloaded all necessary route information and actionable data to the removable media unit 208, they remove the removable media unit 208 from the personal computer 202 and transfer it to their vehicle 102 via the vehicle telematics unit 114. From this point forward, as the vehicle location changes and vehicle events occur, the route directions and actionable data respond as they have been configured.

Figure 3:
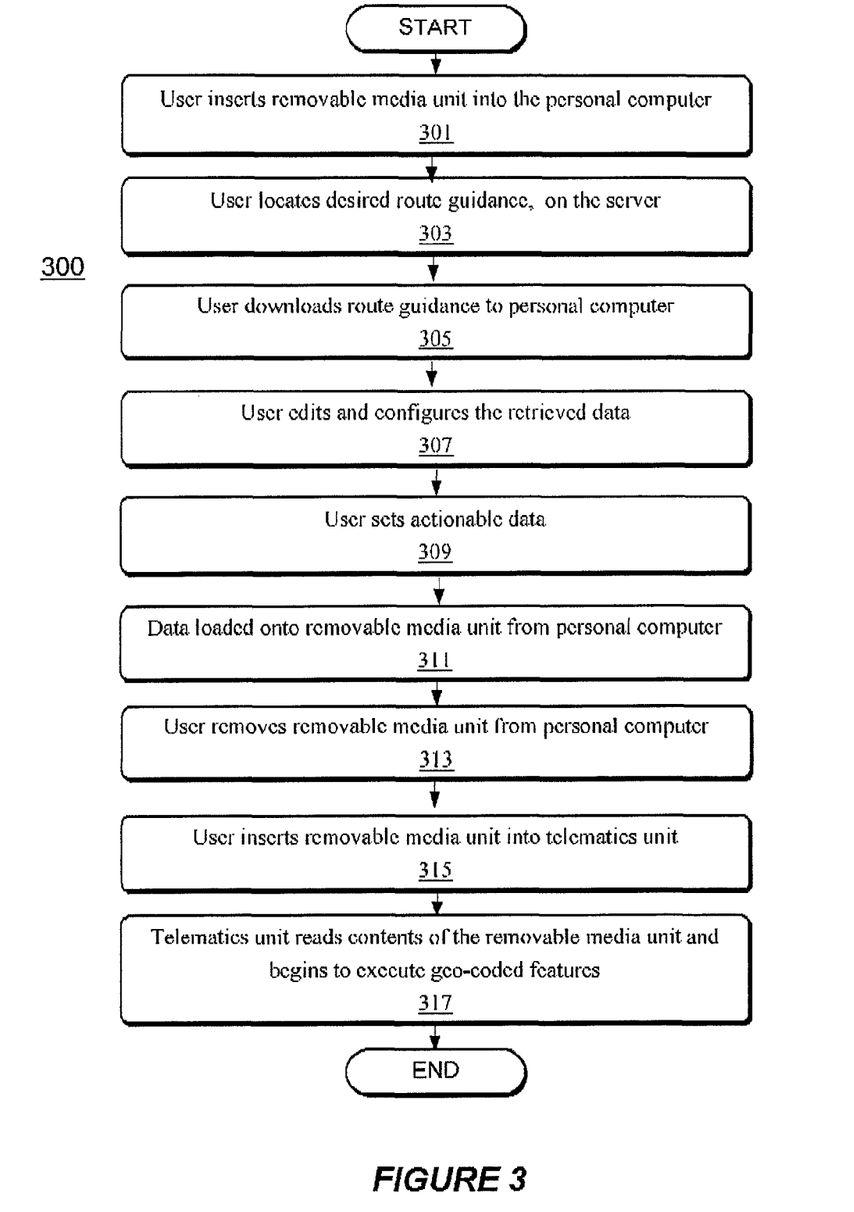
FIG. 3 is a flow diagram illustrating a process of providing route guidance in accordance with an exemplary implementation.

The flow chart of FIG. 3 illustrates in greater detail a process of providing user-tailored guidance and actionable data in accordance with the disclosed principles. At stage 301 of the process 300, the user inserts the removable media unit 208 into the personal computer 202. The user then locates desired route guidance, e.g., on the server 204 at stage 303. At stage 305, the user downloads the route guidance to the personal computer 202 for processing and storage. The route guidance may be, in an example, a set of audio segments associated with geographic cues or location. For example, an audio segment discussing the history of Niagara Falls would be associated with the location of Niagara Falls, so as to automatically play when the vehicle location matches that of Niagara Falls.

Using an application running on the personal computer 202 in an example, the user edits and configures the retrieved data at stage 307. For example, the user may remove or rearrange waypoints, change a destination, etc. At stage 309, the user employs the application to set actionable data such as trip outset notification to a third party, trip destination arrival notification to a third party, collision notification contact information, etc. Third party notifications may be issued via phone, email, or other suitable contact means, and the user preferably inputs such information as is necessary at stage 309.

Once the data has been configured, it is loaded onto the removable media unit 208 from the personal computer 202 in stage 311 if not already on the removable media unit 208, and the user removes the removable media unit 208 from the personal computer 202 in stage 313. The user inserts the removable media unit 208 into the telematics unit 114 at stage 315, e.g. at the outset of a trip. An application running on the telematics unit 114 reads the contents of the removable media unit 208 at stage 317 and begins to execute geo-coded features such as providing information on sites, providing directions, and sending specified notifications. The information is preferably provided in audio format for the convenience of the driver, although other formats may be used instead depending upon user preference.

Figure 4:
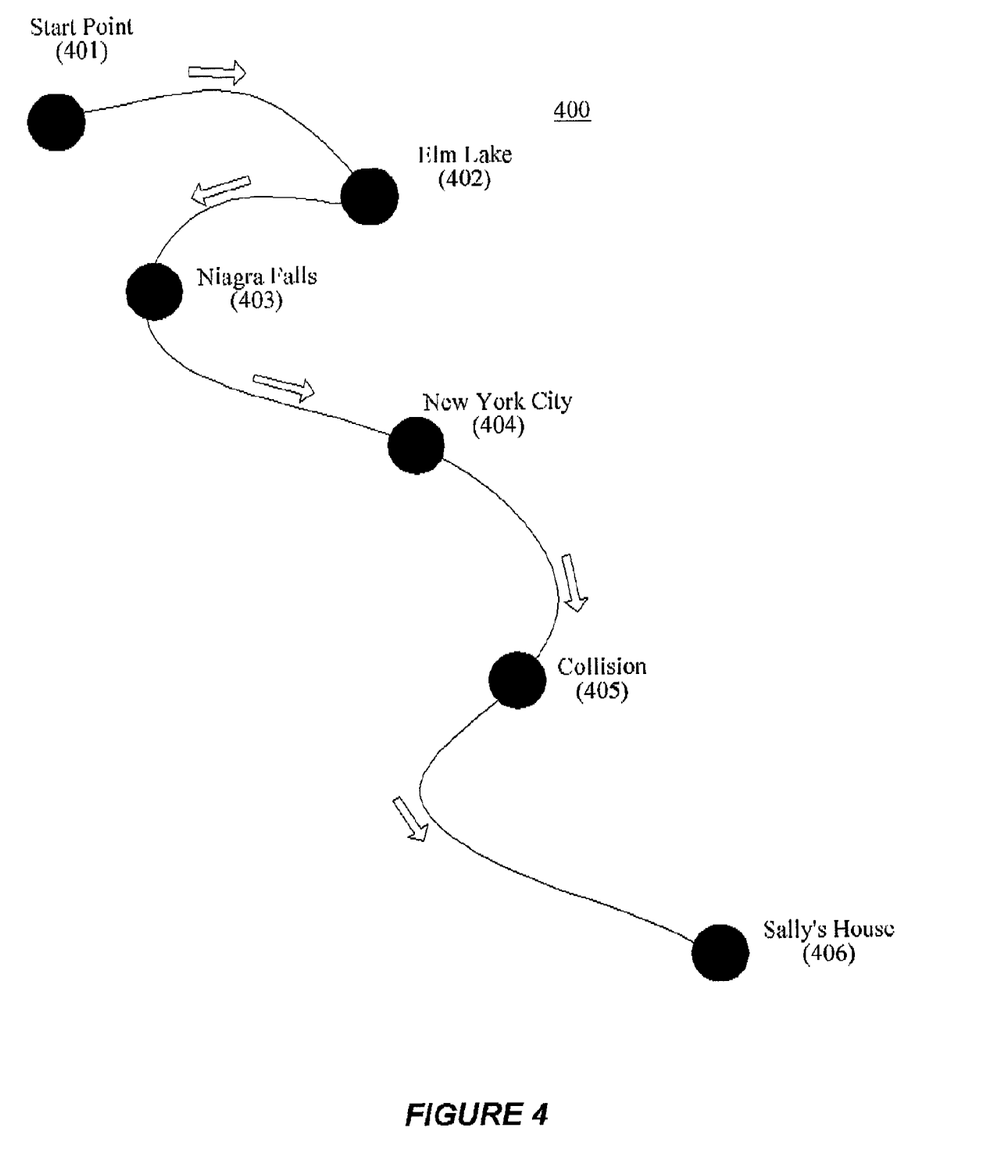
FIG. 4 is a data diagram illustrating a route and associated locations and events in accordance with an exemplary implementation.
Figure 5:
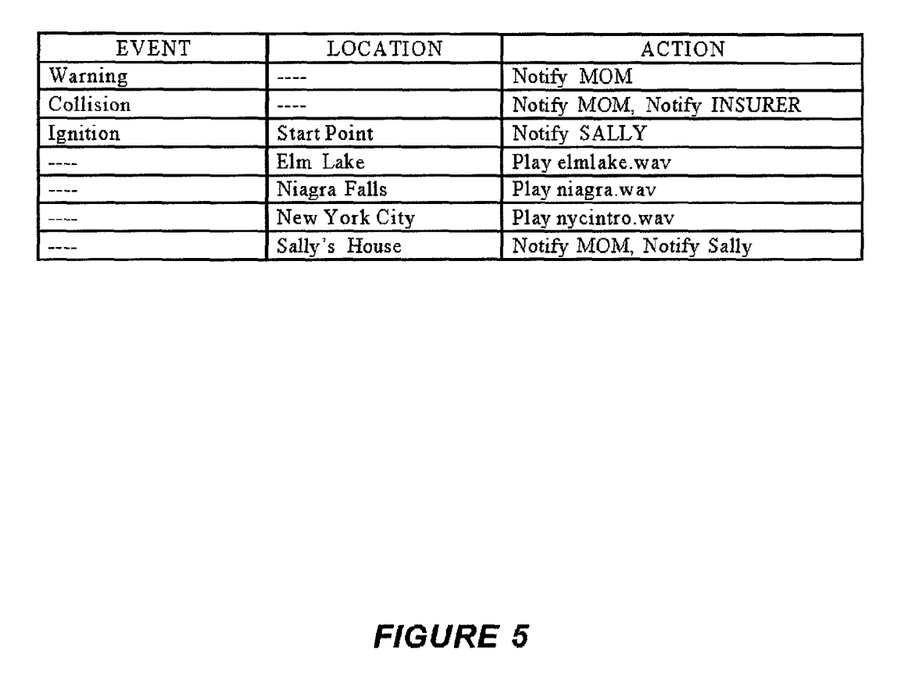
FIG. 5 is a data diagram showing an example set of geo-coded data in accordance with the disclosed principles.

FIG. 4 is a route schematic showing an example route and provided geo-coded actions along the route in accordance with geo-coded data as shown in FIG. 5. The trip 400 begins at the Start Point 401. Per the geo-coded data shown in FIG. 5, the action "Notify MOM" is executed at this stage of the trip 400. As the trip progresses to Elm Lake 402, the telematics unit 114 plays elmlake.wav, which may be an information segment regarding the lake.

Moving on to Niagara Falls 403, the action "Play niagara.wav" is executed. Continuing the trip 4, as the vehicle 102 arrives in New York City 404, the telematics unit plays nycintro.wav per the geo-coded instructions of FIG. 5. On the way from New York 404 to Sally's house 406, the vehicle collides and the collision sensors are triggered. This causes the action corresponding to the "Collision" event to be executed, namely "Notify MOM, Notify INSURER." Everybody is fine, and the trip 400 continues on to its conclusion at Sally's house 406. At this point, the telematics unit executes the geo-coded action corresponding to the location Sally's house 406, e.g., "Notify MOM, Notify Sally."

It will be appreciated that a new system for providing and playing geo-coded audio has been disclosed. All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system, comprising:
a telematics unit of a telematics-equipped vehicle, configured to carry out a method comprising:
receiving event-related data comprising a plurality of event types and a plurality of actions corresponding to the plurality of event types;
wherein the plurality of event types include detection of a: vehicle-related warning condition, a vehicle collision, and arrival at a waypoint on a route;
wherein the plurality of actions include: transmitting a warning-related notification over a wireless network corresponding to detection of the vehicle-related warning condition to one or more individuals external to the vehicle, transmitting a collision-related notification over a wireless network corresponding to detection of the vehicle collision to one or more individuals external to the vehicle, and transmitting a location-related notification external to the detection of arrival at the waypoint on the route to one or more individuals external to the vehicle;
detecting the vehicle-related warning condition; generating, in response to detecting the vehicle-related warning condition, the warning-related notification; and transmitting the warning-related notification over the wireless network to one or more individuals external to the vehicle;
detecting the vehicle collision; generating, in response to detecting the vehicle collision, the collision-related notification; and transmitting the collision-related notification over the wireless network to one or more individuals external to the vehicle;
detecting the arrival of the vehicle at the waypoint on the route; generating, in response to detecting the arrival, the location-related notification; and transmitting the location-related notification to one or more individuals external to the vehicle;
wherein the actions of the event-related data are configurable by a telematics subscriber, including specification of the one or more individuals external to the vehicle to which the warning-notification are transmitted, the one or more individuals external to the vehicle to which the collision-related notification are transmitted, and the one or more individual external to the vehicle to which the location-related notification are transmitted;
a computer linked to a data source for retrieving the event-related data from the data source; and
the removable memory medium for use in conjunction with the computer and the telematics unit, whereby the event-related data is transferred from the computer to the telematics unit via the removable memory medium.

2. The system according to claim 1, wherein the removable memory medium is a flash drive.

3. The system according to claim 1, wherein the data source is a network server communicably linked to the computer.

4. The system according to claim 1, wherein the telematics unit is further configured for: detecting departure from the route by the vehicle; generating, in response to detecting the departure, a departure-related notification; and transmitting the departure-related notification to one or more individuals external to the vehicle, wherein the one or more individuals external to the vehicle to which the departure-related notification are transmitted are also configurable by the telematics subscriber.

5. The system according to claim 1, wherein the one or more individuals external to the vehicle to which the collision-related notification are transmitted includes an insurer.

6. The system according to claim 1, wherein the plurality of actions further includes playback of a multimedia file by the telematics unit corresponding to the detection of arrival at the waypoint on the route, and the telematics unit is further configured for:
playing back the multimedia file in response to detecting the arrival of the vehicle at the waypoint on the route.

7. A method for a telematics unit of a telematics-equipped vehicle to perform event-triggered actions, the method comprising:
receiving, by a telematics unit of the vehicle, event-related data comprising a plurality of event types and a plurality of actions corresponding to the plurality of event types;
wherein the plurality of event types include detection of: a vehicle-related warning condition, a vehicle collision, and arrival at a waypoint on a route;
wherein the plurality of actions: include transmitting a warning-related notification over a wireless network corresponding to detection of the vehicle-related warning condition to one or more individuals external to the vehicle, transmitting a collision-related notification over a wireless network corresponding to detection of the vehicle collision to one or more individuals external to the vehicle, and transmitting a location-related notification external to the detection of arrival at the waypoint on the route to one or more individuals external to the vehicle;
detecting, by the telematics unit, the vehicle-related warning condition; generating, in response to detecting the vehicle-related warning condition, the warning-related notification; and transmitting the warning-related notification over the wireless network to one or more individuals external to the vehicle;
detecting, by the telematics unit, the vehicle collision; generating, in response to detecting the vehicle collision, the collision-related notification; and transmitting the collision-related notification over the wireless network to one or more individuals external to the vehicle; and
detecting, by the telematics unit, the arrival of the vehicle at the waypoint on the route; generating, in response to detecting the arrival, the location-related notification; and transmitting the location-related notification to one or more individuals external to the vehicle;
wherein the actions of the event-related data are configurable by a telematics subscriber, including specification of the one or more individuals external to the vehicle to which the warning-notification are transmitted, the one or more individuals external to the vehicle to which the collision-related notification are transmitted, and the one or more individual external to the vehicle to which the location-related notification are transmitted.

8. The method according to claim 7, further comprising:
detecting, by the telematics unit, departure from the route by the vehicle; generating, in response to detecting the departure, a departure-related notification; and transmitting the departure-related notification to one or more individuals external to the vehicle, wherein the one or more individuals external to the vehicle to which the departure-related notification are transmitted are also configurable by the telematics subscriber.

9. The method according to claim 7, wherein the one or more individuals external to the vehicle to which the collision-related notification are transmitted includes an insurer.

10. The method according to claim 7, wherein the plurality of actions further includes playback of a multimedia file by the telematics unit corresponding to the detection of arrival at the waypoint on the route, and wherein the method further comprises:

playing back the multimedia file in response to detecting the arrival of the vehicle at the waypoint on the route.

11. A non-transitory computer-readable medium having processor-executable instructions stored thereon for a telematics unit of a telematics-equipped vehicle to perform event-triggered actions, the processor-executable instructions comprising instructions for:

receiving event-related data comprising a plurality of event types and a plurality of actions corresponding to the plurality of event types;

wherein the plurality of event types include detection of: a vehicle-related warning condition, a vehicle collision, and arrival at a waypoint on a route;

wherein the plurality of actions include: transmitting a warning-related notification over a wireless network corresponding to detection of the vehicle-related warning condition to one or more individuals external to the vehicle, transmitting a collision-related notification over a wireless network corresponding to detection of the vehicle collision to one or more individuals external to the vehicle, and transmitting a location-related notification external to the detection of arrival at the waypoint on the route to one or more individuals external to the vehicle;

detecting the vehicle-related warning condition; generating, in response to detecting the vehicle-related warning condition, the warning-related notification; and transmitting the warning-related notification over the wireless network to one or more individuals external to the vehicle;

detecting the vehicle collision; generating, in response to detecting the vehicle collision, the collision-related notification; and transmitting the collision-related notification over the wireless network to one or more individuals external to the vehicle; and detecting the arrival of the vehicle at the waypoint on the route; generating, in response to detecting the arrival, the location-related notification; and transmitting the location-related notification to one or more individuals external to the vehicle;

wherein the event types and the actions of the event-related data are configurable by a telematics subscriber, including specification of the one or more individuals external to the vehicle to which the warning-notification are transmitted, the one or more individuals external to the vehicle to which the collision-related notification are transmitted, and the one or more individual external to the vehicle to which the location-related notification are transmitted.

12. The non-transitory computer-readable medium according to claim 11, wherein the processor-executable instructions further comprise instructions for:

detecting departure from the route by the vehicle; generating, in response to detecting the departure, a departure-related notification; and transmitting the departure-related notification to one or more individuals external to the vehicle, wherein the one or more individuals external to the vehicle to which the departure-related notification are transmitted are also configurable by the telematics subscriber.

13. The non-transitory computer-readable medium according to claim 11, wherein the one or more individuals external to the vehicle to which the collision-related notification are transmitted includes an insurer.

14. The non-transitory computer-readable medium according to claim 11, wherein the plurality of actions further includes playback of a multimedia file by the telematics unit corresponding to the detection of arrival at the waypoint on the route, and wherein the processor-executable instructions further comprise instructions for:

playing back the multimedia file in response to detecting the arrival of the vehicle at the waypoint on the route.

* * * * *